(12) United States Patent
Beckert et al.

(10) Patent No.: US 8,431,477 B2
(45) Date of Patent: Apr. 30, 2013

(54) METHOD FOR JOINING ALIGNED DISCRETE OPTICAL ELEMENTS

(75) Inventors: Erik Beckert, Arnstadt (DE); Henrik Banse, Jena (DE); Elke Zakel, Falkensee (DE); Matthias Fettke, Berlin (DE)

(73) Assignee: Fraunhofer-Gesellschaft zur forderung der Angewandten Forschung e.V., Munich (DE)

( * ) Notice: Subject to any disclaimer, the term of this patent is extended or adjusted under 35 U.S.C. 154(b) by 835 days.

(21) Appl. No.: 12/522,366

(22) PCT Filed: Jan. 8, 2008

(86) PCT No.: PCT/DE2008/000038
§ 371 (c)(1), (2), (4) Date: Oct. 14, 2009

(87) PCT Pub. No.: WO2008/083676
PCT Pub. Date: Jul. 17, 2008

(65) Prior Publication Data
US 2010/0038348 A1 Feb. 18, 2010

(30) Foreign Application Priority Data
Jan. 9, 2007 (DE) .................. 10 2007 002 436

(51) Int. Cl.
*H01L 21/44* (2006.01)

(52) U.S. Cl.
USPC .... 438/612; 438/613; 257/779; 257/E21.508; 257/E21.51

(58) Field of Classification Search ............ 438/612, 438/613; 257/779, E21.508, E21.51
See application file for complete search history.

(56) References Cited

U.S. PATENT DOCUMENTS

| 5,302,414 | A | * | 4/1994 | Alkhimov et al. ............ 427/192 |
| 5,478,005 | A | | 12/1995 | Nguyen |
| 2004/0104460 | A1 | | 6/2004 | Stark |
| 2006/0219760 | A1 | * | 10/2006 | Wagoh et al. ............ 228/248.1 |

FOREIGN PATENT DOCUMENTS

| DE | 26 220 00 | 12/1977 |
| DE | 102 40 355 | 3/2004 |
| WO | 2005/111687 | 11/2005 |

OTHER PUBLICATIONS

International Search Report and Written Opinion for PCT/DE2008/000038 dated Apr. 22, 2008.
Database Inspec, The Institution of Electrical Engineers, Stevenage, GB, "Jet vapor deposition for Au/Sn solder applications", Database accession No. 7660599, BD. 12, Nr. 2, Feb. 2003, 4 pages.

* cited by examiner

*Primary Examiner* — Hsien Ming Lee
(74) *Attorney, Agent, or Firm* — Barnes & Thornburg LLP

(57) ABSTRACT

A method for joining aligned discrete optical elements by which the optical elements can be joined in the aligned state. A thermal connection having long-term stability can be produced at little expense and with high positioning accuracy. Surface regions to be joined can be provided with at least one thin metallic layer by the method for joining aligned discrete optical elements. The surface regions are subsequently wetted using a liquid solder free of flux in a contactless dosed manner. The solder is applied to the surface regions to be joined via a nozzle using a pressurized gas stream.

25 Claims, No Drawings

METHOD FOR JOINING ALIGNED DISCRETE OPTICAL ELEMENTS

CROSS REFERENCE TO RELATED APPLICATIONS

This application is the U.S. national phase of PCT/DE2008/000038 filed Jan. 8, 2008. PCT/DE2008/000038 claims benefit under the Paris Convention to German Patent Application DE 10 2007 002 436.5 filed Jan. 9, 2007. The disclosures of both DE 10 2007 002 436.5 and PCT/DE2008/000038 are hereby incorporated herein by reference.

The invention relates to a method for joining aligned discrete optical elements. The most varied devices having optical components are increasingly desired with smaller dimensions and are also provided accordingly. In this respect, the correspondingly present optical elements inter alia also have a very small size, but must nevertheless be positioned very precisely and must then be fixed in the desired exact position. The fastening of such optical elements in this respect has to be designed with long term stability, with temperature stability and with radiation stability to ensure the function of the total optical system in the long term. It must moreover be taken into account that most of the optical elements which can be used are manufactured at least in part from optically transparent materials which are, however, critical with respect to their thermal and mechanical properties.

Primarily clamping connections or also bonding connections are used for joining and assembling for the applications in question. In clamping processes, mechanical strains cannot be avoided which, however, in particular have a negative effect on very small optical elements; and, on the other hand, problems arise in that clamping connections can only be realized with great difficulty as a result of the very small size.

However, bonding is used most frequently as the joining process for the optical elements in question. In this respect, the conventional adhesives, however, only have limited temperature stability and long-term stability, can degas, tend toward degradation under exposure to radiation (e.g. UV) and shrinking on curing can also not be avoided. In addition, the curing of an adhesive is a time-consuming process, during which the exact positioning and fixing of the respective optical element still not yet connected with material continuity has to be maintained.

A further possibility for the connection of the most varied parts with material continuity is soldering. This connection process has, however, previously not yet been easily used with optical elements, even though solders are in some cases better suited as a joining medium than the conventionally used adhesives. In this respect, the low creep of solders in comparison with adhesives in particular has an effect so that at least the effect of this drawback has to be reduced by a flux. However, other disadvantages in turn occur due to fluxes such as degassing effects or a flux residue in the solder connection established with material continuity. On a conventional manufacture of solder connections, there is moreover frequently a non-uniform distribution of a solder over the respective surfaces to be connected to one another so that an inhomogeneous distribution of the solder within a join gap is recorded. This can be compensated in part by exertion of compressive forces with which the parts or elements to be joined together are pressed together. In particular with optical elements and very particularly with miniaturized optical elements, this can, however, frequently not be carried out without damage or even incorrect positioning arising. The solder must moreover be kept liquid for longer, for which additional thermal energy is required.

It is therefore the object of the invention to propose a method with which optical elements can be joined in the aligned state, with a thermal and long-term connection being able to be manufactured with a low effort and/or cost and with high positioning accuracy.

In accordance with the invention, this object is solved by a method having the features of claim 1. Advantageous embodiments and further developments of the invention can be achieved using features designated in subordinate claims.

In the invention, the procedure is followed that surface regions on optical elements to be joined are provided with a thin metal layer. The wetting behavior for solders which can be used can be considerably improved by such thin metal layers. In this respect, it can be a question of a single thin metallic layer on the surface of an optical element to be joined, or also a plurality of metal layers formed on top of one another on the surface.

Liquid solder is then applied in a contactless manner and in metered form to the previously metalized surface for the joining. In this respect, the flux-free solder is applied to the surface to be joined in a contactless manner via a nozzle with a pressurized gas flow. The solder then covers a short path from the nozzle outlet up to the surface to be joined in a "free-flying" manner.

The solder can be applied to a surface region provided for the joining. It can, however, also be applied in a form in accordance with the invention into a join gap which is formed between the optical element to be joined and a further element or a further component to which the respective optical element should be permanently connected.

Titanium, chromium, gold, tungsten and/or platinum as well as also alloys of these metals can preferably be used for the formation of thin metal layers. The usually used vacuum coating processes in PVD or also CVD techniques can be used for the manufacture of the thin metal layers. The thin metal layers can be manufactured very precisely with the aid of known means used in these processes for the manufacture of thin metal layers, with this applying to the respective positions, dimensions, geometrical designs and also to the respective layer thicknesses. The metallization of corresponding joining surfaces on substrates or in holders can be made as a thin metal layer or as a thick metal layer by means of conventional pressure technologies.

If a plurality of thin metal layers form such a layer system, the topmost layer onto which the solder should then be applied should in particular be selected while taking account of the respective solder used. Gold can preferably be used for this topmost thin metal layer.

Eutectic alloys can preferably be used as suitable solders in order in particular to avoid a negative thermal effect on the materials of which the respective optical elements are made. Such eutectic solders can, for example, be gold-tin alloys, silver-tin alloys or bismuth-tin alloys whose melting temperature can also be considerably below 300° C.

The melting of the solder used directly before the actual application can preferably be achieved by laser radiation. The melted solder can then, as already indicated, take place via a nozzle using a gas flow which is under higher pressure and which then presses the liquid solder out of the nozzle which can, as necessary, be made in the form of a suitable cannula.

A procedure can be followed in this respect such that the respective specific solder volume is melted and is then applied in liquid, metered form to the surface region to be joined. In this respect, a solder volume should be used in the range from 0.005 to 1.5 mm$^3$ per surface mm$^2$.

The application of the liquid solder can in this respect also be carried out in pulsed form, with the position for the respective application of liquid solder on surface regions to be joined being able to be changed between the individual pulses, which is, on the one hand, favorable with larger area surface regions to be joined and, on the other hand, should also take place in a plurality of mutually differing planes in one application. It is advantageous for the last named case to use an applicator which is movable and positionable in two dimensions, preferably in three dimensions. Very particularly advantageously, it should be able to be controlled electronically to be able to carry out the method in accordance with the invention in an automated manner. The corresponding movements of an applicator for solder can, however, also be carried out with the help of an otherwise conventional industrial robot, or a similar device, which can then in turn be operated with electronic control and automatically.

On the manufacture of the connection with material continuity with the solder used, the strength of the connection can be improved since intermetallic phases or mixed crystals can be formed in the region of the topmost thin metal layer or of a thick metal layer and the solder.

A fixing of optical elements can be achieved with high precision and high strength over long periods of time with the invention by the direct and metered supply of solder. The connection has temperature stability and is also resistant toward electromagnetic radiation. Join gaps which have e.g. arisen through alignment processes can be bridged homogeneously by the solder volume used. This substantially influences the achievable precision after the joining of optical elements. Smaller joining gaps result in a higher precision due to the lower solder volumes required and simultaneously reduce the costs for the material effort.

Both simple optical elements and optical elements of complex design can be fastened permanently and with high precision in flexible form to individual parts, components or also sub-assemblies using the method in accordance with the invention.

The use of fluxes can easily be dispensed with to avoid their disadvantages. The existing join gaps can be bridged by the possibility of a defined metering on the carrying out of the method in accordance with the invention. Both a passive alignment (positioning against abutment structures) and an active alignment of the components to be joined can thereby be carried out.

There is the possibility of an extremely flexible application of the solder so that complex geometries which are difficult to access can also be taken into account. A simple automation is also possible in conjunction with other assembly steps which can be carried out simultaneously or offset in time for the formation of the join connection.

The strength of the join connection is achieved directly after the curing of the solder, that is, briefly after its application, so that the disadvantages which usually occur with bond connections can be avoided.

An additional heat input, for example in the form of a preheating or subsequent radiation is likewise not necessary in the invention.

The solder supply, the remelting of the solder and the application of the solder in the liquid state take place directly at the joining location, with a uniform distribution of the liquid solder also being able to be utilized with the help of the energy of the gas pressure of the gas flow used. An inert gas which can then in turn simultaneously satisfy a protective gas function can particularly advantageously be used for the gas flow.

The method in accordance with the invention can be used for practically all types of optical and optoelectronic systems and elements in which discrete optical elements have to be assembled and in which special conditions such as environmental conditions have to be taken into account which stand in the way of a use of conventional adhesives.

The invention can thus be used for the manufacture of laser and LED lighting modules for medical engineering or lithography, of optical lighting systems for optical semi-conductor systems or also of optical medical systems suitable for autoclaving (endoscopes) and many others. It is in particular suitable for optical elements or components having such optical elements which can come into contact with the body's own tissue and can be biocompatible to avoid defense reactions.

The invention should be explained in more detail by way of example in the following.

On an optical module, a collimating lens should be aligned in six degrees of freedom to a beam source/laser diode located on a substrate and should be fixed to enable an ideal fiber coupling of electromagnetic radiation. Thin metal layers with a layer structure of titanium, chromium and gold and a total layer thickness of 0.5 to 1 µm are formed at the outer circumference of the collimating lens.

For this purpose, the collimating lens metalized at the outer circumference is aligned actively in a cavity of the substrate to a maximum degree of coupling by means of a special grip. Subsequently, auxiliary elements are positioned to the side of the lens on the substrate provided with thin metal layers at a spacing from the collimating lens which is as small as possible, said auxiliary elements likewise being metalized. While taking account of a special soldering order and of the join tolerances resulting therefrom, the auxiliary elements are first joined to the at least one respective position using the method in accordance with the invention using approx. 1.5 mm$^3$ AgSnCu solder on the substrate. The proportion of copper in the solder is very small in this respect. Subsequently to this, the collimating lens is connected at at least one respective position to each auxiliary element with approx. 1.5 mm$^3$ AgSnCu solder using the method in accordance with the invention.

The total joining process can be carried out in the range of some seconds by the use of a special substrate holder and an assembly robot. When corresponding process routines are used for the active lens alignment, a high automation potential is simultaneously given.

The invention claimed is:

1. A method for joining aligned discrete optical elements, the method comprising:
   providing the aligned discrete optical elements with surface regions which are to be joined;
   providing at least one metal layer on the surface regions of the aligned discrete optical elements; and
   subsequently wetting a surface of the at least one metal layer by applying liquid, flux-free solder, via a nozzle using a pressurized gas flow, to the surface regions to be joined in a contact-free, metered manner.

2. A method in accordance with claim 1 wherein the liquid, flux-free solder is applied in a join gap.

3. A method in accordance with claim 2 wherein the liquid, flux-free solder is distributed over the surface regions to be joined by the pressurized gas flow.

4. A method in accordance with claim 3 wherein the at least one metal layer is formed with at least one of titanium, chromium, gold, tungsten and platinum.

5. A method in accordance with claim 4 wherein an upper metal layer onto which the liquid, flux-free solder is applied is formed by gold.

6. A method in accordance with claim 3 wherein an upper metal layer onto which the liquid, flux-free solder is applied is formed by gold.

7. A method in accordance with claim 2 wherein the at least one metal layer is formed with at least one of titanium, chromium, gold, tungsten and platinum.

8. A method in accordance with claim 7 wherein an upper metal layer onto which the liquid, flux-free solder is applied is formed by gold.

9. A method in accordance with claim 2 wherein an upper metal layer onto which the liquid, flux-free solder is applied is formed by gold.

10. A method in accordance with claim 1 wherein the liquid, flux-free solder is distributed over the surface regions to be joined by the gas flow.

11. A method in accordance with claim 10 wherein the at least one metal layer is formed with at least one of titanium, chromium, gold, tungsten and platinum.

12. A method in accordance with claim 11 wherein an upper metal layer onto which the liquid, flux-free solder is applied is formed by gold.

13. A method in accordance with claim 10 wherein an upper metal layer onto which the liquid, flux-free solder is applied is formed by gold.

14. A method in accordance with claim 1 wherein the at least one metal layer is formed with at least one of titanium, chromium, gold, tungsten and platinum.

15. A method in accordance with claim 14 wherein an upper metal layer onto which the liquid, flux-free solder is applied is formed by gold.

16. A method in accordance with claim 1 wherein an upper metal layer onto which the liquid, flux-free solder is applied is formed by gold.

17. A method in accordance with claim 1 wherein the liquid, flux-free solder comprises a eutectic alloy.

18. A method in accordance with claim 1 wherein the liquid, flux-free solder comprises at least one of a gold-tin alloy, a silver-tin alloy and a bismuth-tin alloy.

19. A method in accordance with claim 1 wherein the pressurized gas flow comprises an inert gas flow.

20. A method in accordance with claim 1 wherein the liquid, flux-free solder is melted using laser radiation prior to its application.

21. A method in accordance with claim 1 wherein at least one of intermetallic phases and mixed crystals are formed within a transition region with the liquid, flux-free solder and at least one of the at least one metal layer and a thick metal layer thicker than the at least one metal layer.

22. A method in accordance with claim 1 wherein the liquid, flux-free solder is applied in a pulsed manner.

23. A method in accordance with claim 22 wherein the position for the application on the surface region to be joined is changed on the pulsed application.

24. A method in accordance with claim 1 wherein an applicator for the liquid, flux-free solder is moved and positioned in three dimensions.

25. A method in accordance with claim 24 wherein the applicator is electronically controlled.

* * * * *

UNITED STATES PATENT AND TRADEMARK OFFICE
CERTIFICATE OF CORRECTION

PATENT NO. : 8,431,477 B2
APPLICATION NO. : 12/522366
DATED : April 30, 2013
INVENTOR(S) : Beckert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this
Eighth Day of September, 2015

Michelle K. Lee
*Director of the United States Patent and Trademark Office*